US011932228B2

(12) United States Patent
Hutchins et al.

(10) Patent No.: US 11,932,228 B2
(45) Date of Patent: Mar. 19, 2024

(54) METHOD AND PARKING BRAKE APPARATUS FOR AN AUTONOMOUSLY DRIVABLE VEHICLE

(71) Applicant: Bendix Commercial Vehicle Systems LLC, Avon, OH (US)

(72) Inventors: Christopher H Hutchins, Bay Village, OH (US); Gerhard Wieder, Besigheim (DE); Jonas Leibbrand, Eberdingen-Nu?dorf (DE)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 21 days.

(21) Appl. No.: 17/855,894

(22) Filed: Jul. 1, 2022

(65) Prior Publication Data

US 2022/0332300 A1    Oct. 20, 2022

Related U.S. Application Data

(63) Continuation of application No. 16/812,723, filed on Mar. 9, 2020, now Pat. No. 11,407,394.

(51) Int. Cl.
*B60T 8/92* (2006.01)
*B60T 7/12* (2006.01)
(Continued)

(52) U.S. Cl.
CPC .............. *B60T 8/92* (2013.01); *B60T 7/122* (2013.01); *B60T 8/1701* (2013.01); *B60T 8/885* (2013.01);
(Continued)

(58) Field of Classification Search
CPC ........ B60T 8/92; B60T 8/1701; B60T 8/4818; B60T 7/122; B60T 13/683; B60T 15/18; B60T 17/08; B60T 2201/10; B60T 2270/402; B60T 2270/413; B60T 8/48; B60T 7/12; F16H 63/483; F16H 63/486
See application file for complete search history.

(56) References Cited

U.S. PATENT DOCUMENTS 6,256,570 B1 * 7/2001 Weiberle ................. B60T 13/74
188/170
6,447,074 B2 * 9/2002 Engelhard ................. B60T 8/32
303/3

(Continued)

FOREIGN PATENT DOCUMENTS

EP              3421312 B1 * 11/2020 .............. B60T 15/36
WO     WO-2017146242 A1 *  8/2017 ............ B60T 13/662

*Primary Examiner* — Thomas J Williams
(74) *Attorney, Agent, or Firm* — Cheryl L. Greenly; Brian E. Kondas

(57) ABSTRACT

A parking brake apparatus is provided for an autonomously drivable vehicle having components of a parking brake system for applying a parking brake. The parking brake apparatus comprises a first controller arranged to provide one or more control signals to be applied to components of the parking brake system to apply the parking brake in response to a signal requesting the parking brake to be applied. The parking brake apparatus also comprises a second controller arranged to provide one or more control signals to be applied to other components of the parking brake system to apply the parking brake in response to unavailability of the first controller to cause the parking brake to be applied.

2 Claims, 5 Drawing Sheets

(51) Int. Cl.
  *B60T 8/17* (2006.01)
  *B60T 8/88* (2006.01)
  *B60T 13/68* (2006.01)
  *B60T 15/18* (2006.01)
  *B60T 17/08* (2006.01)
  *F16H 59/54* (2006.01)
  *F16H 63/48* (2006.01)

(52) U.S. Cl.
  CPC ............ *B60T 13/683* (2013.01); *B60T 15/18* (2013.01); *B60T 17/08* (2013.01); *F16H 59/54* (2013.01); *F16H 63/483* (2013.01); *F16H 63/486* (2013.01); *B60T 2201/10* (2013.01); *B60T 2270/402* (2013.01); *B60T 2270/413* (2013.01)

(56) References Cited

U.S. PATENT DOCUMENTS

| | | | | |
|---|---|---|---|---|
| 6,969,127 | B2* | 11/2005 | Suzuki | F16D 65/18 |
| | | | | 303/20 |
| 10,549,731 | B2* | 2/2020 | Lauffer | B60T 13/662 |
| 11,407,394 | B2* | 8/2022 | Hutchins | B60T 7/122 |
| 2013/0282249 | A1* | 10/2013 | Heise | B60T 13/746 |
| | | | | 701/70 |
| 2018/0056963 | A1* | 3/2018 | Krueger | B60T 13/741 |
| 2018/0328430 | A1* | 11/2018 | Feigel | B60T 13/746 |
| 2019/0152459 | A1* | 5/2019 | Dieckmann | B60T 13/662 |
| 2019/0168730 | A1* | 6/2019 | Park | B60T 7/22 |
| 2019/0337502 | A1* | 11/2019 | Farres | B60T 8/17 |
| 2019/0344762 | A1* | 11/2019 | Alfter | B60T 8/17 |
| 2022/0332300 | A1* | 10/2022 | Hutchins | F16H 63/483 |

* cited by examiner

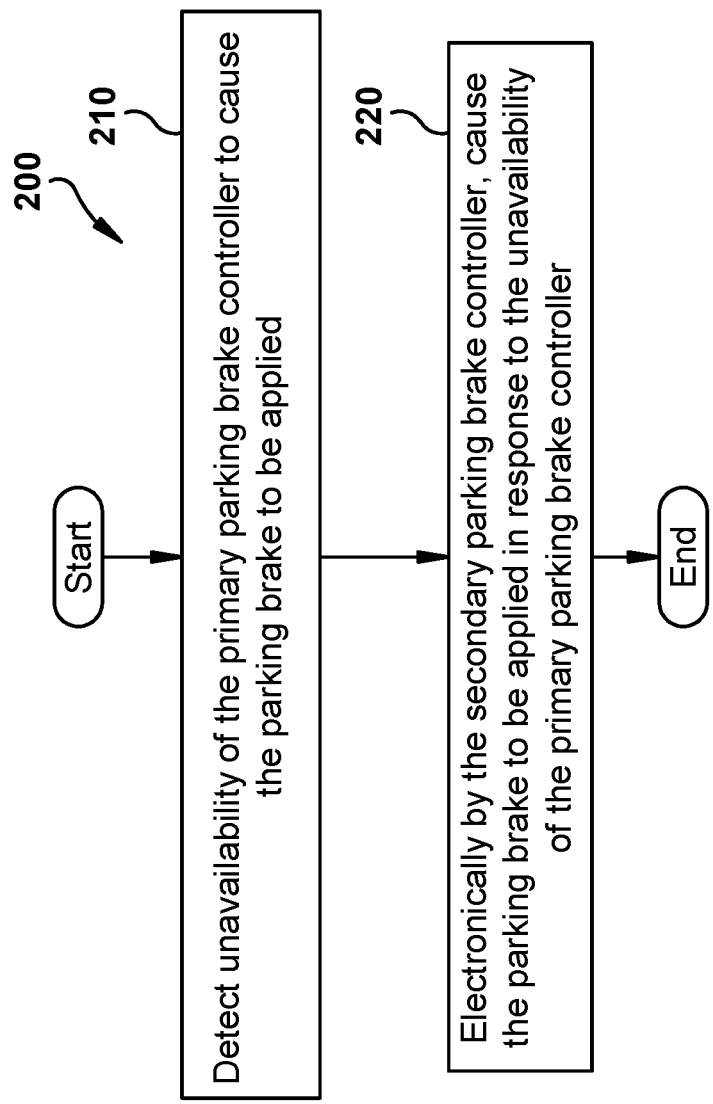

METHOD AND PARKING BRAKE APPARATUS FOR AN AUTONOMOUSLY DRIVABLE VEHICLE

CROSS REFERENCE TO RELATED APPLICATIONS

This application is a continuation of the pending U.S. patent application Ser. No. 16/812,723 entitled "Method and Parking Brake Apparatus for an Autonomously Drivable Vehicle" filed on Mar. 9, 2020, the entire disclosure of which is incorporated fully herein by reference.

BACKGROUND

The present application relates to vehicle parking systems, and is particularly directed to a method and parking brake apparatus for an autonomously drivable vehicle, such as for a parking system of an autonomously drivable commercial truck.

Vehicle parking systems for commercial trucks are known. One type of vehicle parking system for trucks is an electronic parking system in which the parking brake is automatically applied using a primary parking mechanism when certain criteria associated with the truck or the truck driver are met. In some electronic parking systems, a second parking mechanism as a backup is provided for applying the parking brake in the event that the primary parking mechanism is unable to cause the parking brake to be applied. These known second parking mechanisms require the truck driver to take some manual action to activate the secondary parking mechanism after the truck driver is alerted that the primary parking mechanism has been unable to cause the parking brake to be applied.

The known secondary parking mechanisms can be used in any type of truck including autonomously drivable trucks. However, in the case of an autonomously driven truck, some manual action from an occupant of the autonomously driven truck would still be needed to activate the secondary parking mechanism if the primary parking mechanism were unable to cause the parking brake to be applied. Accordingly, those skilled in the art continue with research and development efforts in the field of parking systems of a vehicle, such as a commercial truck, that includes a primary parking mechanism, and may or may not include a secondary parking mechanism as a backup to the primary parking mechanism.

SUMMARY

In accordance with one embodiment, a parking brake apparatus is provided for an autonomously drivable vehicle having components of a parking brake system for applying a parking brake. The parking brake apparatus comprises a first controller arranged to provide one or more control signals to be applied to components of the parking brake system to apply the parking brake in response to a signal requesting the parking brake to be applied. The parking brake apparatus also comprises a second controller arranged to provide one or more control signals to be applied to other components of the parking brake system to apply the parking brake in response to unavailability of the first controller to cause the parking brake to be applied.

In accordance with another embodiment, a parking brake apparatus is provided for an autonomously drivable vehicle having components of a parking brake system for applying a parking brake. The parking apparatus comprises a primary parking brake controller arranged to control one or more parking brake valves to enable one or more parking brake springs to apply the parking brake in response to a signal requesting the parking brake to be applied. The parking brake apparatus also comprises means for, when the vehicle is autonomously driven and without requiring any manual action from an occupant of the autonomously driven vehicle, controlling the one or more parking brake valves to enable the one or more parking brake springs to apply the parking brake when the primary parking brake controller is unable to cause the parking brake to be applied.

In accordance with still another embodiment, a computer-implemented method is provided for an autonomously drivable vehicle having a parking brake, a primary parking brake controller, and a secondary parking brake controller which is different from the primary parking brake controller. The computer-implemented method comprises detecting unavailability of the primary parking brake controller to cause the parking brake to be applied. The method also comprises electronically by the secondary parking brake controller, causing the parking brake to be applied in response to the unavailability of the primary parking brake controller.

BRIEF DESCRIPTION OF THE DRAWINGS

FIG. 2 is a flow diagram depicting an example computer-implemented method for operating a parking brake apparatus in accordance with an embodiment.

DETAILED DESCRIPTION

The present application is directed to a parking brake apparatus for an autonomously drivable vehicle such as a commercial truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1A:
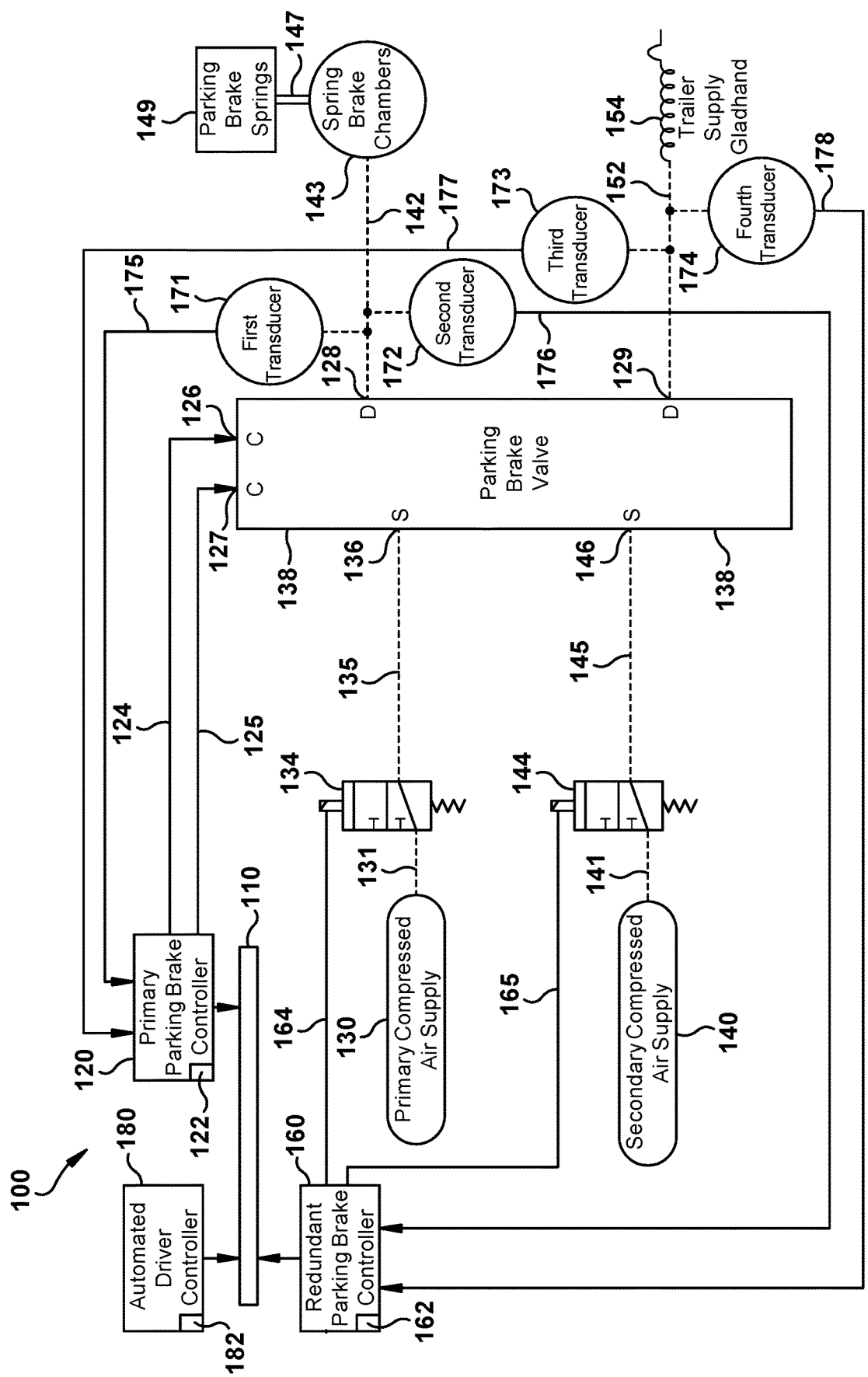
FIG. 1A is a schematic block diagram showing an example parking brake apparatus for an autonomously drivable vehicle, and constructed in accordance with an embodiment.

Referring to FIG. 1A, a schematic block diagram showing an example parking brake apparatus 100 for an autonomously drivable vehicle, and constructed in accordance with an embodiment is illustrated. In FIG. 1A, electrical line connections are shown as solid lines, pneumatic lines connections are shown as dashed lines, and mechanical couplings are shown as double solid lines.

Parking brake apparatus 100 includes a controller area network (CAN) bus 110 to which a number of vehicle devices are connected to communicate with each other. The CAN bus 110 may be in a standardized serial communication format, such as SAE J1939, or in a proprietary format.

It is conceivable that some or all of the vehicle devices be hardwired for communication instead of using the CAN bus 110 for communication.

Vehicle devices that may be connected to the CAN bus 110 include, but are not limited to, a first controller as a primary parking brake controller 120, a second controller as a redundant parking brake controller 160, and a third controller as an automated driver controller 180. The primary parking brake controller 120 may provide to the CAN bus 110 a variety of signals including configuration messages, diagnostic status, and brake-specific signals such as parking brake status, and parking brake pressure. Similarly, the redundant parking brake controller 160 may provide to the CAN bus 110 a variety of signals including configuration messages, diagnostic status, and brake-specific signals such as parking brake status, and parking brake pressure. The automated driver controller 180 may provide to the CAN bus 110 a variety of signals including configuration messages, diagnostic status, the driving mode (i.e., autonomous, semi-autonomous, or driver-controlled), and desired intent of the status of the vehicle (e.g., stop, go, park). The CAN bus 110 enables the primary parking brake controller 120, the redundant parking brake controller 160, and the automated driver controller 180 to communicate with each other.

A primary compressed air supply 130 provides a source of compressed air in line 131 through a first 3/2 normally-open solenoid valve 134 and then in line 135 to a first supply port 136 of a parking brake valve 138. As an example, the parking brake valve 138 may comprise a valve such available as part of the Bendix Intellipark® system, commercially available from Bendix Commercial Vehicle Systems LLC located in Elyria, Ohio. The first 3/2 normally-open solenoid valve 134 is disposed between the primary compressed air supply 130 and the parking brake valve 138. Similarly, a secondary compressed air supply 140 provides a source of compressed air in line 141 through a second 3/2 normally-open solenoid valve 144 and then in a line 145 to a second supply port 146 of the parking brake valve 138. The second 3/2 normally-open solenoid valve 144 is disposed between the secondary compressed air supply 140 and the parking brake valve 138. Each of the first and second 3/2 normally-open solenoid valves 134, 144 may comprise a Bendix AT-3™ solenoid valve, commercially available from Bendix Commercial Vehicle Systems LLC.

Although the above description describes the use of a 3/2 normally-open solenoid valve, it is conceivable that another type of valve may be used. For example, an antilock brake system (ABS) valve may be used, such as a Bendix M-40™ modulator valve, commercially available from Bendix Commercial Vehicle Systems LLC. For purpose of explanation, the use of 3/2 normally-open solenoid valves will be described herein.

The primary parking brake controller 120 is in the form of an electronic controller unit that is arranged to monitor signals on the CAN bus 110 to provide one or more control signals to apply the parking brake based upon control logic 122 that is stored in a data storage unit of the primary parking brake controller 120. The primary parking brake controller 120 provides one or more signals on lines 124, 125 to first and second control ports 126, 127 of the parking brake valve 138 to control delivery of compressed air (originating from first and second compressed air supplies 130, 140) to first and second delivery ports 128, 129 of the parking brake valve 138.

The parking brake valve 138 is controlled by control logic 122 of parking brake controller 120 to vary pneumatic pressure in line 142 to one or more chambers of spring brake chambers 143 and also to vary pneumatic pressure in line 152 to trailer supply gladhands 154. More specifically, when the parking brake of the vehicle is applied, the primary parking brake controller 120 provides one or more signals on lines 124, 125 to parking brake valve 138 so as to exhaust air in one or more chambers of spring brake chambers 143. The spring brake chambers 143 are operatively coupled via line 147 in known manner to parking brake springs 149. When air in spring brake chambers 143 is exhausted and system air pressure drops to less than about 45 psi to 60 psi, the parking brake springs 149 are activated to apply the vehicle parking brake, as is known. Structure and operation of primary parking brake controller 120 and parking brake valve 138 for controlling operation of spring brake chambers 143 and parking brake springs 149 to apply the parking brake are conventional and, therefore, will not be further described.

At the same time the pneumatic pressure in line 142 to the one or more spring brake chambers 143 is varied to apply the parking brake, the pneumatic pressure in line 152 to the trailer supply gladhands 154 (which are connectable to a trailer parking brake of the vehicle) is varied to enable the trailer parking brake to be applied. Structure and operation of primary parking brake controller 120 and parking brake valve 138 for controlling operation of a trailer parking brake via the trailer supply gladhands 154 are conventional and, therefore, will not be further described.

One or more pressure-to-voltage transducers are coupled to corresponding one or more parking brake components. Each pressure-to-voltage transducer provides a voltage indicative of pressure associated with the corresponding parking brake component. More specifically, a first pressure-to-voltage transducer 171 senses pressure in pneumatic line 142 and provides a corresponding voltage on electrical line 175 to the primary parking brake controller 120. A second pressure-to-voltage transducer 172 senses pressure in pneumatic line 142 and provides a corresponding voltage on electrical line 176 to the redundant parking brake controller 160. A third pressure-to-voltage transducer 173 senses pressure in pneumatic line 152 and provides a corresponding voltage on electrical line 177 to the primary parking brake controller 120. A fourth pressure-to-voltage transducer 174 senses pressure in pneumatic line 152 and provides a corresponding voltage on electrical line 178 to the redundant parking brake controller 160.

The redundant parking brake controller 160 is in the form of an electronic controller unit that is arranged to monitor signals on the CAN bus 110 to provide one or more control signals to apply the parking brake based upon control logic 162 that is stored in a data storage unit of the redundant parking brake controller 160. The redundant parking brake controller 160 provides a first control signal on line 164 to the first 3/2 normally-open solenoid valve 134 and a second control signal on 165 to the second 3/2 normally-open solenoid valve 142.

The automated driver controller 180 is in the form of an electronic controller unit that is arranged to monitor signals on the CAN bus 110 indicating that the primary parking brake controller 120 is unavailable to apply the parking brake (or the trailer parking brake). The automated driver controller 180 then provides one or more signals on the CAN bus 110 to activate the redundant parking brake controller 160 to apply the parking brake.

In accordance with an aspect of the present disclosure, the redundant parking brake controller 160 and the automated driver controller 180 cooperate to provide a backup parking brake solution in the event of unavailability of the primary parking brake controller 120 to cause the parking brake to be applied. The automated driver controller 110 monitors the primary parking brake controller 120, detects unavailability of the primary parking brake controller 120 to cause the parking brake to be applied, and activates the redundant parking brake controller 160 to apply the parking brake when the unavailability is detected. More specifically, the redundant parking brake controller 160 has control logic 162 and the automated driver controller 180 has control logic 182 that cooperates with the control logic 162 of the redundant parking brake controller 160 to provide the backup parking brake solution. Although shown separately, it is conceivable that the redundant parking brake controller 160 and the automated driver controller 180 may be combined as a single controller, and that the control logic 162 and the control logic 182 may be combined as a single control logic block.

The first 3/2 normally-open solenoid valve 134 and the second 3/2 normally-open solenoid valve 144 are shown in FIG. 1A in their de-energized positions. In their de-energized positions shown in FIG. 1A, compressed air is supplied through the parking brake valve 138 to the spring brake chambers 143 and to the trailer supply gladhands 154. Both parking brakes (i.e., the parking brake of the truck tractor and the parking brake of the truck trailer) are released (i.e., not applied). When the primary parking brake controller 120 signals the parking brake valve 138 to apply the parking brakes, compressed air in line 142 and compressed air in line 152 are exhausted to atmosphere, which allows the parking brakes to be applied in known manner.

Figure 1B:
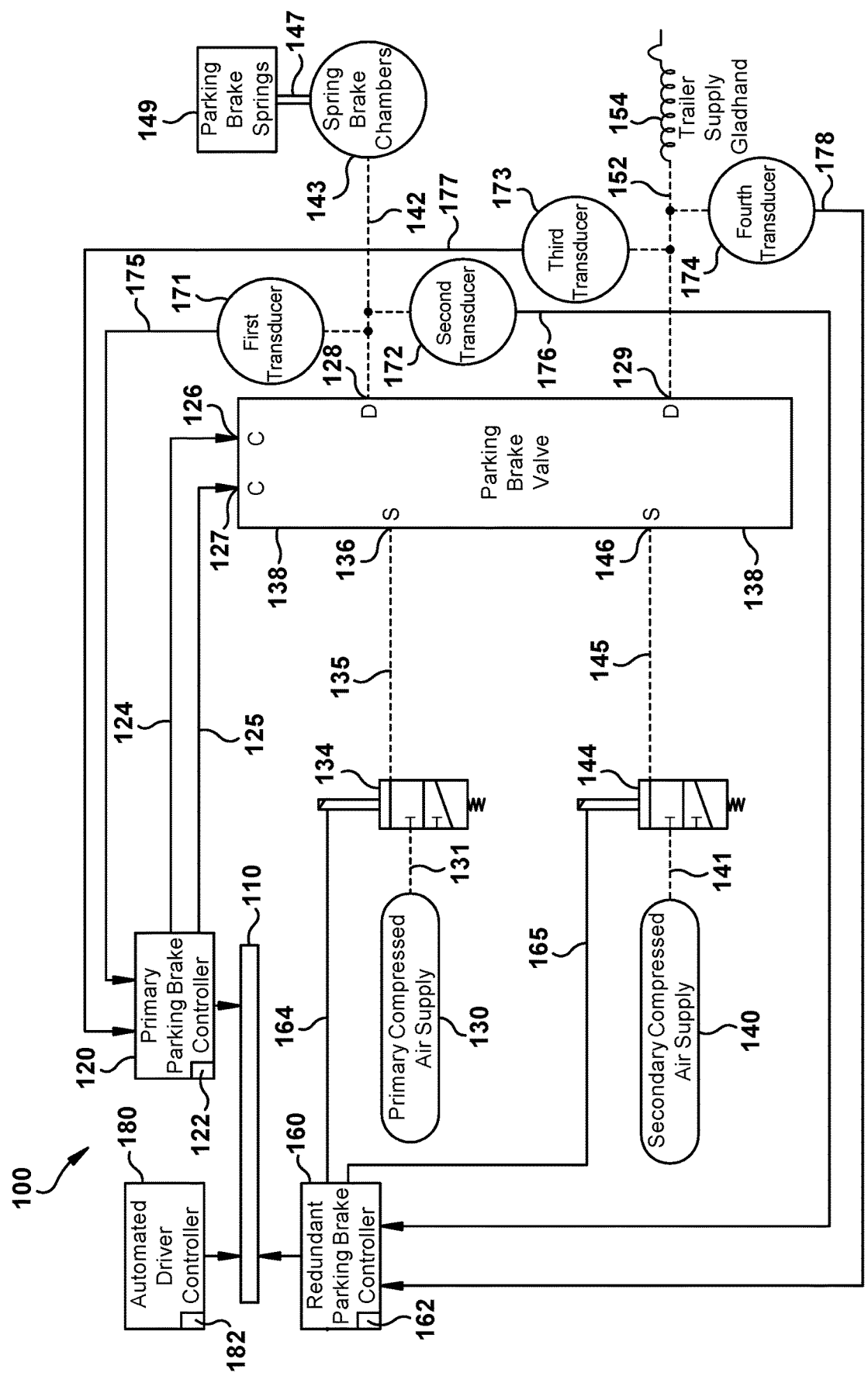
FIG. 1B is a schematic block diagram similar to FIG. 1A, and showing parts in different positions.

However, if the parking brakes do not apply in response to the primary parking brake controller 120 to do so, the redundant parking brake processor 160 and the automated driver controller 180 cooperate to energize the first 3/2 normally-open solenoid valve 134 and the second 3/2 normally-open solenoid valve 144 so as to move them to their energized positions shown in FIG. 1B. In their energized positions shown in FIG. 1B, compressed air from the primary compressed air supply 130 and compressed air from the secondary compressed air supply 140 are blocked by the first and second 3/2 normally-open solenoid valves 134, 144 from reaching the parking brake valve 138 to enable the parking brakes to be applied when the primary parking brake controller 120 signals the parking brake valve 138 to do so. When compressed air is blocked from reaching the spring brake chambers 143 and the trailer supply gladhands 154, the parking brakes are applied.

More specifically, program instructions of a secondary parking brake control algorithm associated with the control logic 162 of the redundant parking brake controller 160 and the control logic 182 of the automated driver controller 180 are executed to provide a backup for the control logic 122 of the primary parking brake controller 120 in the event that the parking brakes are not applied in response to execution of program instructions of a primary parking brake control algorithm associated with the control logic 122 of the primary parking brake controller 120.

The unavailability of the parking brakes to be applied can be due to a number of reasons. One reason may be that the primary parking brake controller 120 does not execute program instructions of the primary parking brake control algorithm to apply the parking brakes in response to a signal requesting the parking brakes to be applied. Another reason may be that one or more control signals from the primary parking brake controller 120 do not reach parking brake components so that the parking brakes can be applied. Yet another reason may be due to unresponsiveness of a portion of the parking brake valve 138 (e.g., an internal relay valve of the parking brake valve 138). Still another reason may be due to loss of communication between certain vehicle components including components of the parking brake system. Other reasons for unavailability of the parking brakes to be applied are possible.

Referring to FIG. 2, a flow diagram 200 depicts an example computer-implemented method of operating a parking brake apparatus in accordance with an embodiment. The computer-implemented method is for an autonomously drivable vehicle having a parking brake, a primary parking brake controller, and a secondary parking brake controller which is different from the primary parking brake controller.

In block 210, the process begins by detecting unavailability of the primary parking brake controller to cause the parking brake to be applied. The detecting may be performed by looking at the memory of the primary parking brake controller or at a CAN bus for a signal that is indicative of unavailability of the parking brake to be applied in response the primary parking brake controller to do so. Then, in block 220, the secondary parking brake controller responds by causing the parking brake to be applied in response to the unavailability of the primary parking brake controller. As an example, the secondary parking brake controller is responsive to the primary parking brake controller sending a signal stating that it is unavailable. As another example, the secondary parking brake controller is responsive to the primary parking brake controller simply not communicating at all when the secondary parking brake controller sees that the vehicle needs to park (e.g., when the secondary parking brake controller sees a message from an automated driver controller indicating that the vehicle needs to park). The process then ends.

In some embodiments, the secondary parking brake controller causes the parking brake to be applied when the unavailability of the primary parking brake controller to cause the parking brake to be applied is due to inability of the primary parking brake controller to provide one or more control signals for applying to one or more parking brake valves to enable one or more parking brake springs to apply the parking brake.

In some embodiments, the secondary parking brake controller causes the parking brake to be applied when the unavailability of the primary parking brake controller to cause the parking brake to be applied is due to inability of one or more control signals from the primary parking brake controller to reach one or more parking brake valves to enable one or more parking brake springs to apply the parking brake.

In some embodiments, the secondary parking brake controller causes the parking brake to be applied when the unavailability of the primary parking brake controller to cause the parking brake to be applied is due to absence of response of a parking brake valve of the parking brake system.

In some embodiments, unavailability of the primary parking brake controller to cause the parking brake to be applied is detected by the secondary parking brake controller receiving a signal from the primary parking brake controller stating that the primary parking brake controller is unavailable.

In some embodiments, unavailability of the primary parking brake controller to cause the parking brake to be applied is detected by the secondary parking brake controller receiving a signal from an autonomous driver controller stating that the primary parking brake controller is unavailable.

In some embodiments, the method is performed by a processor having a memory executing one or more programs of instructions which are tangibly embodied in a program storage medium readable by the processor.

Program instructions for enabling the secondary parking brake controller (e.g., the redundant parking brake controller 160 together with the automated driver controller 180 shown in FIGS. 1A and 1B) to perform operation steps in accordance with the flow diagram 200 shown in FIG. 2 may be embedded in memory internal to the controllers. Alternatively, or in addition to, program instructions may be stored in memory external to the controllers. As an example, program instructions may be stored in memory internal to a different electronic controller unit of the vehicle. It is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units. Program instructions may be stored on any type of program storage media including, but not limited to, external hard drives, flash drives, and compact discs. Program instructions may be reprogrammed depending upon features of the particular electronic controller unit.

Figure 3A:
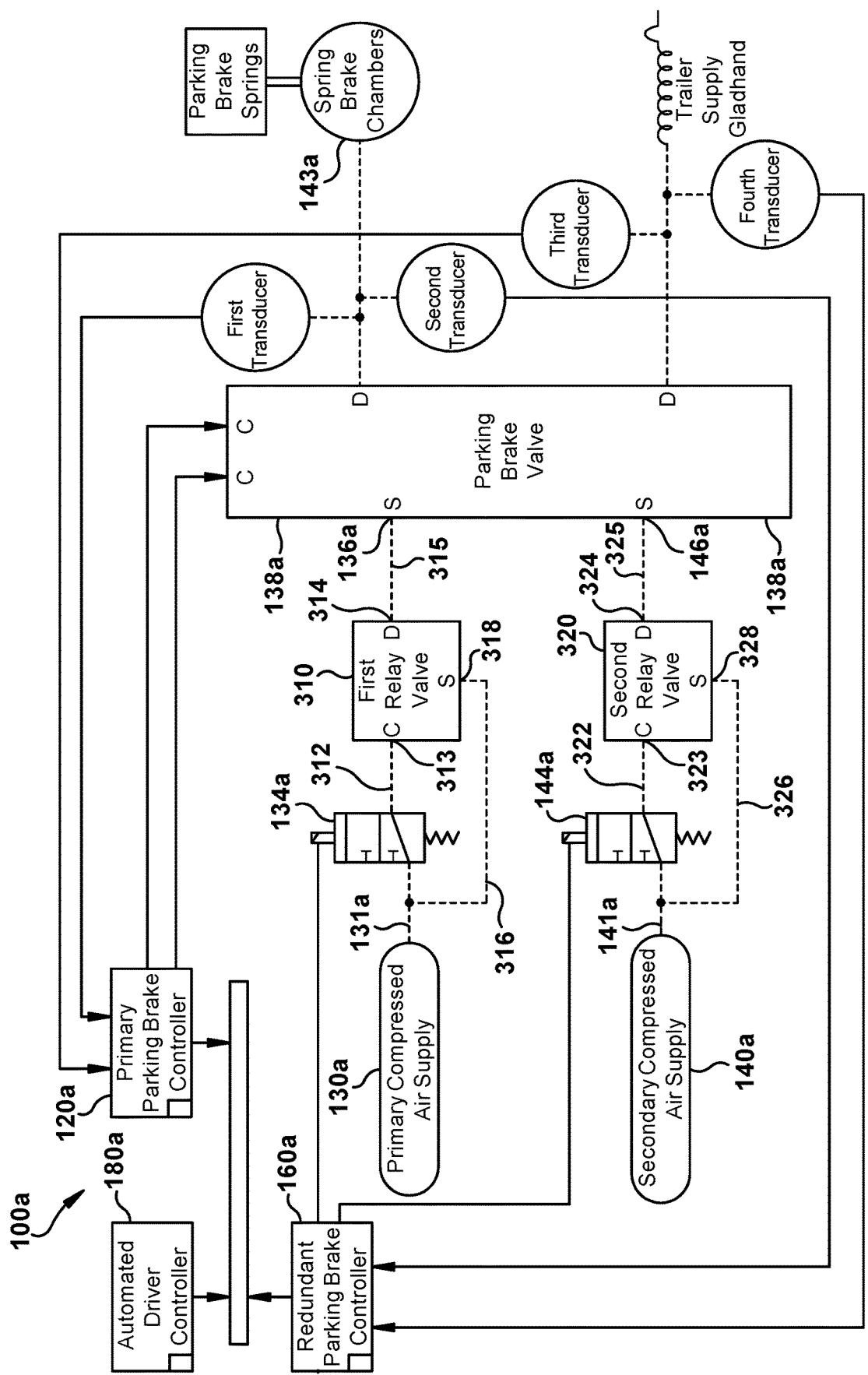
FIG. 3A is a schematic block diagram showing an example parking brake apparatus for an autonomously drivable vehicle, and constructed in accordance with another embodiment.
Figure 3B:
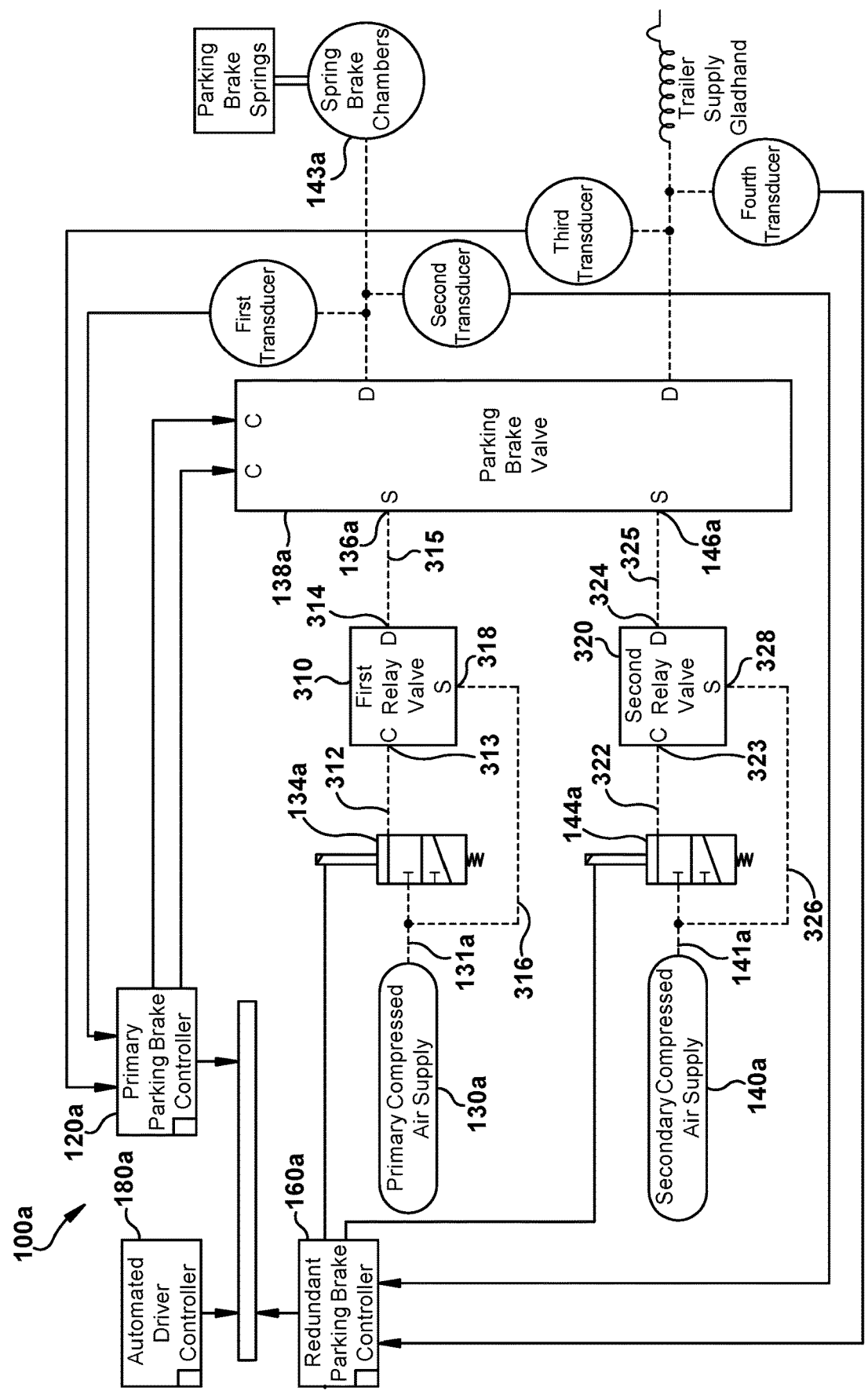
FIG. 3B is a schematic block diagram similar to FIG. 3A, and showing parts in different positions.

A second embodiment of a parking brake apparatus is illustrated in FIGS. 3A and 3B. Since the embodiment illustrated in FIGS. 3A and 3B is generally similar to the embodiment illustrated in FIGS. 1A and 1B, similar numerals are utilized to designate similar components, the suffix letter "a" being associated with the embodiment of FIGS. 3A and 3B to avoid confusion.

Parking brake apparatus 100a comprises primary parking brake controller 120a, redundant parking brake controller 160a, and automated driver controller 180a. Primary parking brake controller 120a controls operation of parking brake valve 138a and spring brake chambers 143a in similar manner that primary parking brake controller 120 controls parking brake valve 138 and spring brake chambers 143 as described hereinabove in the embodiment of FIGS. 1A and 1B.

Similarly, redundant parking brake controller 160a controls operation of first and second 3/2 normally-open solenoid valves 134a, 144a in similar manner that redundant parking brake controller 160 controls operation of first and second 3/2 normally-open solenoid valves 134, 144 as described hereinabove in the embodiment of FIGS. 1A and 1B. Automated driver controller 180a communicates with primary parking brake controller 120a and redundant parking brake controller 160a in same manner that automated driver controller 180 communicates with primary parking brake controller 120 and redundant parking brake controller 160 as described hereinabove in the embodiment of FIGS. 1A and 1B.

In the embodiment of FIGS. 3A and 3B, a first relay valve 310 is disposed between first 3/2 normally-open solenoid valve 134a and parking brake valve 138a. Similarly, a second relay valve 320 is disposed between second 3/2 normally-open solenoid valve 144a and parking brake valve 138a.

Compressed air is supplied from primary compressed air supply 130a in line 131a to first 3/2 normally-open solenoid valve 134a and then in line 312 to control port 313 of first relay valve 310. Pneumatic line 315 interconnects delivery port 314 of first relay valve 310 and supply port 136a of parking brake valve 138a. Compressed air is also supplied from primary compressed air supply 130a in line 316 to supply port 318 of first relay valve 310.

Compressed air is supplied from secondary compressed air supply 140a in line 141a to second 3/2 normally-open solenoid valve 144a and then in line 322 to control port 323 of second relay valve 320. Pneumatic line 325 interconnects delivery port 324 of second relay valve 320 and supply port 146a of parking brake valve 138a. Compressed air is also supplied from secondary compressed air supply 140a in line 326 to supply port 328 of second relay valve 320.

In the event that primary parking brake controller 120a is unavailable to cause the parking brake to be applied, redundant parking brake controller 160a and automated driver controller 180a cooperate to energize first and second 3/2 normally-open solenoid valves 134a, 144a to move them from their de-energized positons shown in FIG. 3A to their energized positions shown in FIG. 3B to apply the parking brake in the same manner as described hereinabove in the embodiment of FIGS. 1A and 1B. However, in the embodiment shown in FIGS. 3A and 3B, the use of first and second relay valves 310, 320 in conjunction with first and second 3/2 normally-open solenoid valves 134a, 144a increases compressed air flow capacity to parking brake valve 138a to apply the parking brake while reducing the electrical power needed to energize first and second 3/2 normally-open solenoid valves 134a, 144a.

It should be apparent that the above description describes a backup parking brake system for a main parking brake system of an autonomously driven vehicle that may or may not have a human "driver" occupying the autonomously driven vehicle. If a human driver is occupying the autonomously driven vehicle, the human driver is not an integral part of the backup parking brake system (i.e., no manual action is required from the human driver to activate the backup parking brake system in the event of unavailability of the main parking brake system to apply the parking brake). Accordingly, the backup parking brake system causes the parking brake to be applied when the main parking brake system is unable to cause the parking brake to be applied, such as when a control signal is unable to reach a parking brake valve or when a parking brake valve is unresponsive.

It should also be apparent that the parking brake control algorithms associated with the parking brake apparatus 100 of FIGS. 1A and 1B and the parking brake apparatus 100a of FIGS. 3A and 3B are integrated into a practical application of implementing a low-cost backup parking brake mechanism for autonomously drivable vehicles. The backup parking brake mechanism is low cost since implementation requires the addition of essentially only a pair of 3/2 normally-open solenoid valves and a pair of controllers (or just a single controller if the redundant parking brake controller and the automated driver controller are combined).

A number of advantages result by providing an autonomously drivable vehicle with the above-described parking brake apparatus 100 of FIGS. 1A and 1B (and the parking brake apparatus 100a of FIGS. 3A and 3B) to provide the backup parking brake mechanism.

One advantage is that, even if the main parking brake system were to be unavailable, service brake pressure can be retained (i.e., does not need to be exhausted to atmosphere) so that the service brake can continue to hold the vehicle if needed. This eliminates the need to unload compressed air or the need to shut down the vehicle engine.

Another advantage is that since the first and second 3/2 normally-open solenoid valves 134, 144 are controlled by one controller (i.e., the redundant parking brake controller 160), there is no need to coordinate solenoid valve diagnostics between two controllers. This simplifies parking brake system design, and facilitates troubleshooting when servicing of the parking brake mechanisms is needed.

Still another advantage is that since two pressure-to-voltage transducers 171, 172 are coupled to pneumatic line 142 to the spring brake chambers 143, an independent indication of air pressure in spring brake chambers 143 is provided. Similarly, since two pressure-to-voltage transducers 173, 174 are coupled to pneumatic line 154 to the trailer supply gladhands 154, an independent indication of air pressure in trailer supply gladhands 154 is provided. This is advantageous because additional information may be used to satisfy additional functional safety requirements of the system.

Moreover, although the above description describes the use of pressure-to-voltage transducers 171, 172, 173, 174, it is conceivable that other types of transducers may be used, such as wheel speed-to-voltage transducers (i.e., wheel speed sensors). As an example, with the use of wheel speed sensors (either alone or in conjunction with pressure-to-voltage transducers), it is possible to monitor for the following sequence of events: (1) the vehicle is stationary with the parking brake released, (2) the vehicle is stationary with the main parking brake system indicating the parking brake is activated, and (3) the vehicle is moving with the main parking brake system indicating the parking brake is activated. Observation of this sequence of events indicates a rollaway-from-park rather than a rollaway due to unavailability or inability of the parking brake to be applied when needed. If this occurs, the automated driver controller 180 could use the service brake to stop the vehicle or use the backup parking brake system to attempt to park the vehicle while continuing to monitor the wheel speed sensors to determine whether the vehicle is remaining stationary.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for an autonomously drivable vehicle having components of a parking brake system for applying a parking brake, the parking apparatus comprising:
   a primary parking brake controller arranged to control one or more parking brake valves to enable one or more parking brake springs to apply the parking brake in response to a signal requesting the parking brake to be applied;
   a redundant parking brake controller controlling the one or more parking brake valves to enable the one or more parking brake springs to apply the parking brake when the primary parking brake controller is unable to cause the parking brake to be applied when the vehicle is autonomously driven and without requiring any manual action from an occupant of the autonomously driven vehicle;
   a first electronically controlled valve disposed between a primary compressed air supply and the one or more parking brake valves; wherein the redundant parking brake controller is arranged to provide a first control signal to the first electronically controlled valve in response to the primary parking brake controller being unable to cause the parking brake to be applied; and
   a second electronically controlled valve disposed between a secondary compressed air supply and the one or more parking brake valves; wherein the redundant parking brake controller is arranged to provide a second control signal to the second electronically controlled valve in response to the primary parking brake controller being unable to cause the parking brake to be applied.

2. The parking brake apparatus for an autonomously drivable vehicle according to claim 1, further comprising:
   an autonomous driver controller arranged to (i) monitor the primary parking brake controller, (ii) detect when the primary parking brake controller is unable to respond to the signal requesting the parking brake to be applied, and (iii) activate the redundant parking brake controller to control the one or more parking brake valves to enable the one or more parking brake springs to apply the parking brake when the primary parking brake controller is detected to be unable to cause the parking brake to be applied.

* * * * *